(12) United States Patent
Gretz

(10) Patent No.: US 6,380,489 B1
(45) Date of Patent: Apr. 30, 2002

(54) STUD BUSHING

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 101 days.

(21) Appl. No.: 09/653,998

(22) Filed: Sep. 2, 2000

(51) Int. Cl.$^7$ ............................................... H01B 17/26
(52) U.S. Cl. ............................. 174/152 R; 174/153 G; 174/65 R; 16/2.1
(58) Field of Search ......................... 174/152 R, 65 R, 174/142, 151, 153 G, 167; 16/2.1, 2.5

(56) References Cited

U.S. PATENT DOCUMENTS

| | | | | | |
|---|---|---|---|---|---|
| 4,769,966 | A | * | 9/1988 | Petri | 52/716 |
| 5,343,669 | A | * | 9/1994 | Petri | 52/716.8 |
| 6,296,136 | B1 | * | 10/2001 | Huet | 220/233 |
| 6,300,568 | B1 | * | 10/2001 | Petri | 174/65 G |

* cited by examiner

Primary Examiner—Dean A. Reichard
Assistant Examiner—W. David Walkenhorst

(57) ABSTRACT

A unitary protective stud bushing produced from a resilient plastic and including an elongated base having at least two distinct widths at either end and opposed longitudinal edges, and two rows of spaced apart teeth extending in splayed relationship from said longitudinal edges. Because of the distinct differences in the width of the base, the two rows of teeth are spaced apart different distances along the base such that when turned upon itself the teeth of the bushing along the narrower width nest within the teeth along the wider width. Because of the resilience of the plastic material, the bushing can be turned upon itself, inserted into a hole in steel structural member such that the teeth loosely engage either side of the periphery of the hole and the resilient plastic causes the base to spring open until the inside surface of the base contacts the periphery of the hole and the teeth engage opposing outer surfaces of the periphery of the hole. The bushing is then reliably engaged about the inner periphery by virtue of the teeth engaging the periphery of the hole and being held in place by the resilience of the base and wiring or cabling can be pulled through the hole without the danger of damage thereto.

8 Claims, 3 Drawing Sheets

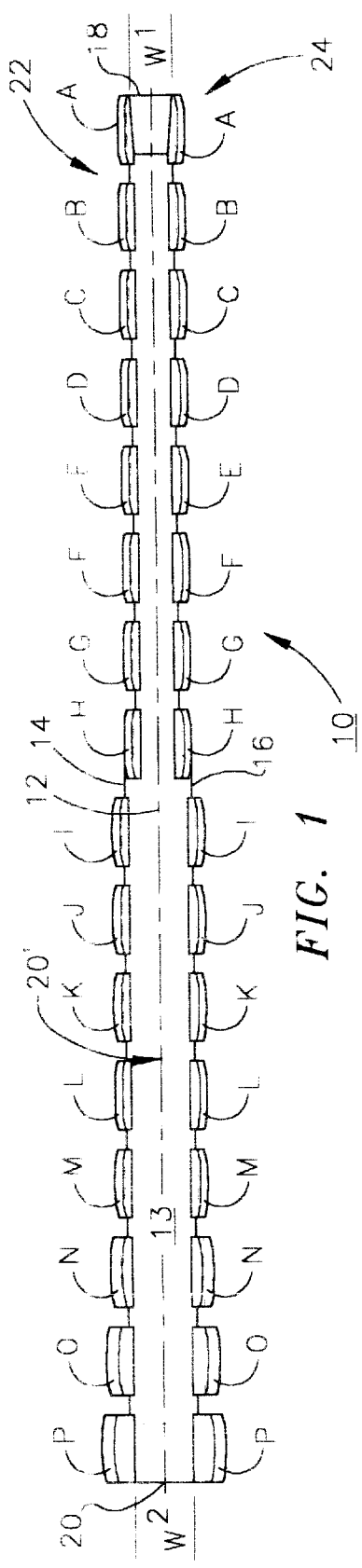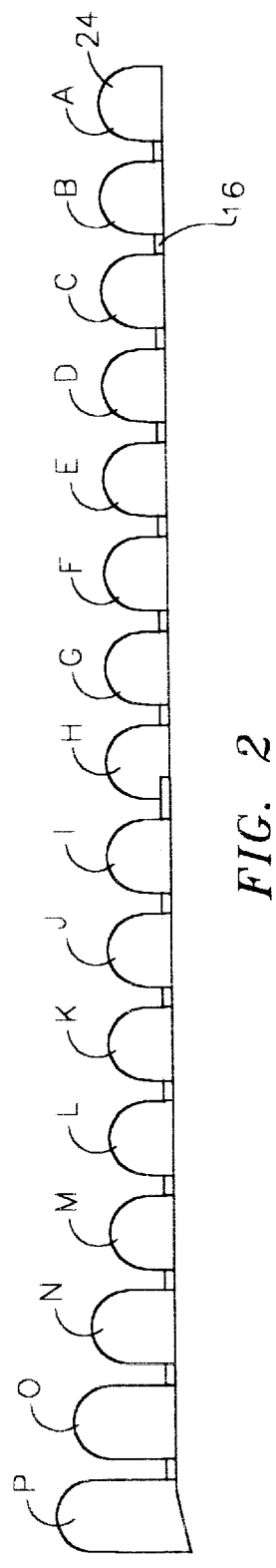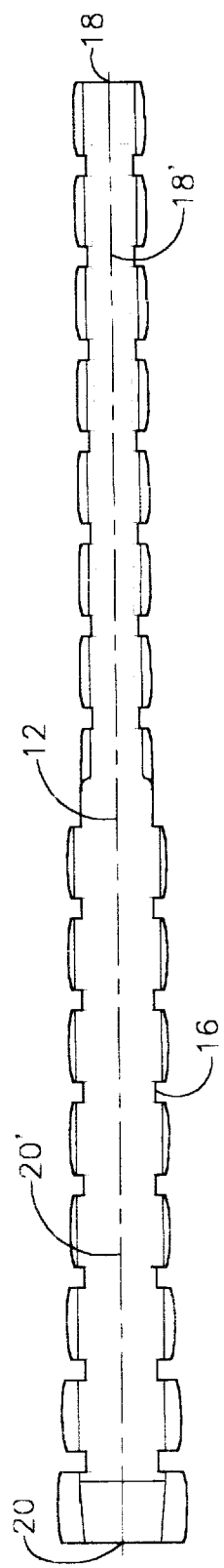

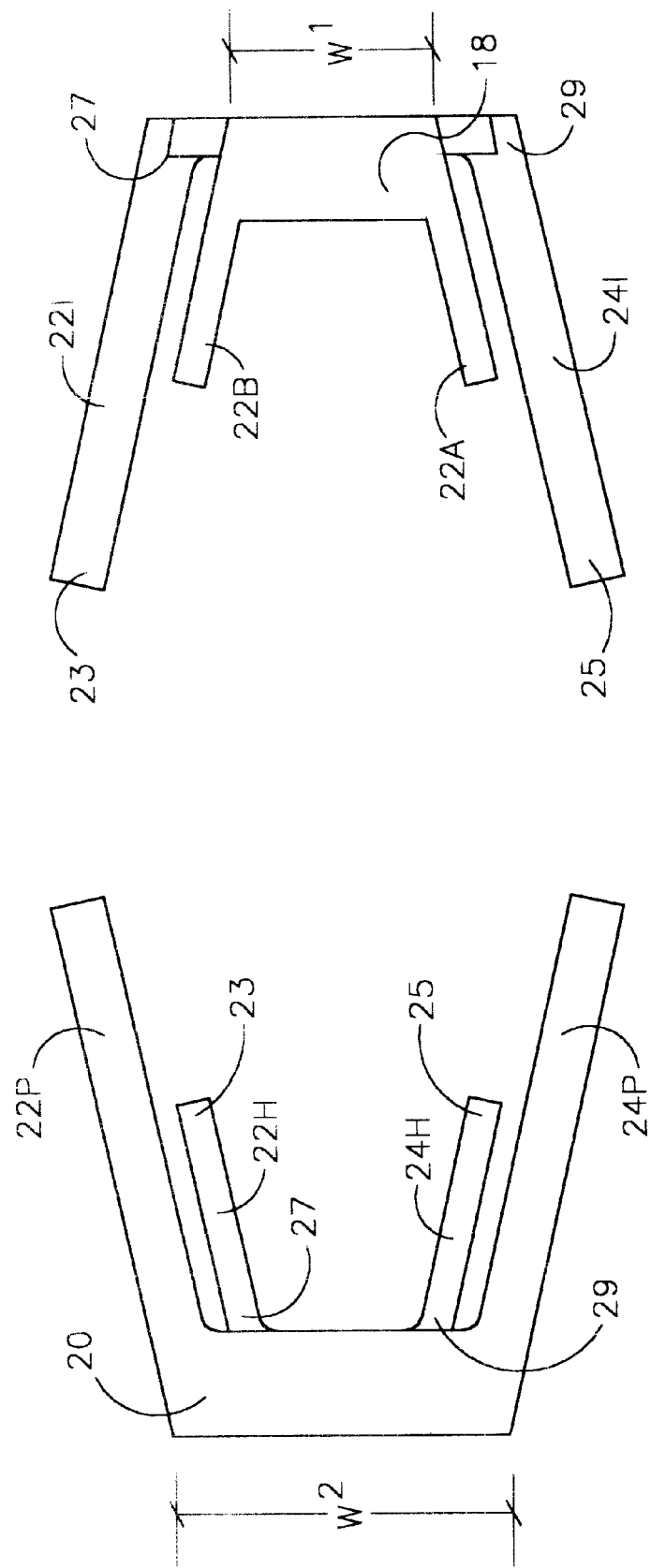

STUD BUSHING

FIELD OF THE INVENTION

The present invention relates to protective devices for wiring and cable, and more particularly to a flexible bushing that can be easily and quickly installed in holes cut in steel and the like structural members the peripheral surfaces of which holes tend to damage inserted wiring and cable during installation.

BACKGROUND OF THE INVENTION

In the installation of wiring in buildings utilizing steel studding, it is common practice to drill holes in the steel studding at all required locations to accommodate the passage of electrical and other wiring. While this method provides a sound construction technique and is generally highly protective of wiring insert through the steel studding or other steel structural member, it is not uncommon for wiring to be damaged while being pulled during installation as the sharp and often erose edges of the freshly drilled hole are drawn across the wiring surface during such installation. With the proliferation of the use of steel structural members even for residential construction, and the use of larger and larger quantities of light gauge telephone, communication and low voltage wiring in all structures, this problem has become even more wide spread.

Thus, there exists a need for an inexpensive and easy to use and install device that can protect wiring and cabling being pulled through holes in such structural members during the pulling operation.

OBJECTS OF THE INVENTION

It is therefore and object of the present invention to provide an inexpensive device for the protection of wiring and cabling being pulled through holes in steel structural members.

It is another object to provide such a protective device that is inexpensive and very easy to install.

SUMMARY OF THE INVENTION

According to the present invention, there is provided a unitary protective bushing produced from a resilient plastic and comprising an elongated base having at least two distinct widths at either end, opposed longitudinal edges, and two rows of spaced apart teeth extending in splayed relationship from said longitudinal edges. Because of the distinct differences in the width of the base, the two rows of teeth are spaced apart different distances along the base such that when turned upon itself the teeth of the bushing along the narrower width nest within the teeth along the wider width. Because of the resilience of the plastic material, the bushing can be turned upon itself, inserted into a hole in steel structural member such that the teeth loosely engage either side of the periphery of the hole and the resilient plastic causes the base to spring open until the inside surface of the base contacts the inside periphery of the hole and the teeth engage the surfaces of the stud about either side of the periphery of the hole. The bushing is then reliably engaged about the inner periphery of the hole by virtue of the teeth engaging the periphery of the hole and being held in place by the resilience of the base. Wiring or cabling can be then pulled through the hole without the danger of damage to thereto.

DESCRIPTION OF THE DRAWINGS

FIG. 1 is a top view of the protective bushing of the present invention.

FIG. 2 is a side left view of the protective bushing of FIG. 1.

FIG. 3 is a bottom view of the protective bushing of FIG. 1.

FIG. 4 is a left end view of the protective bushing of FIG. 1.

FIG. 5 is a right end view of the protective bushing of FIG. 1.

DETAILED DESCRIPTIONS

Figure 7:
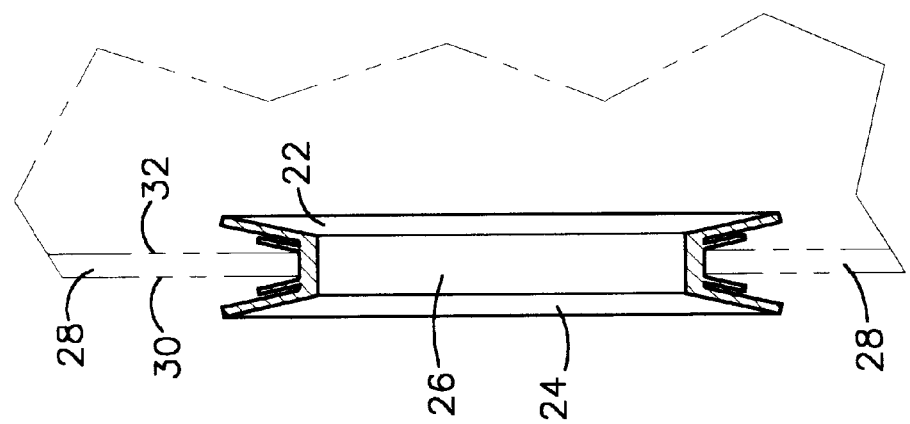
FIG. 7 is a sectional view of the installation shown in FIG. 6.

Referring now to FIG. 1, the protective bushing 10 of the present invention comprises a base 12, having two opposed longitudinal edges 14 and 16, two opposed extremities 18 and 20 and two rows of teeth 22 $a$–$p$ and 24 $a$–$p$ extending in splayed relationship from longitudinal edges 14 and 16. By "splayed relationship" is meant that the outer extremities 23 and 25 of teeth 22 and 24 respectively are further apart than inner extremities 27 and 29 of teeth 22 and 24 as best seen in FIGS. 4 and 5. The width $W^1$ of base 12 in the area of attachment of teeth 22 $a$–$h$ and 24 $a$–$h$ beginning at extremity 18 and identified as area 18' is of a first width adequate to engage the peripheral walls of a hole drilled in a steel structural member as will be explained and shown more fully below, while; the width $W^2$ of base 12 in the area of attachment of teeth 22 $g$–$p$ and 24 $g$–$p$ at extremity 20 and identified as area 20' is of a second width sized to permit nesting of teeth 22 and 24 $a$–$h$ between teeth 22 and 24 $g$–$p$ when protective bushing 10 is turned upon itself to form a circle as more fully described and shown below. $W^1$ will generally be equal to or greater than the wall thickness of a steel stud or about 0.10" and 0.20" while $W^2$ will be determined largely from the outer dimension set by the sum of width $W^1$ and the width imparted by the presence of teeth 22 $a$–$p$ and 24 $a$–$p$.

As best shown in FIG. 2, teeth 22 $a$–$m$ and 24 $a$–$m$ are preferably of about the same height while teeth 22 $n$–$p$ and 24 $n$–$p$ are of a different and even increasing height. While sizing of the teeth is largely a matter of design choice, the purpose of these differences will be explained hereinafter in connection with installation of protective bushing 10.

Figure 6:
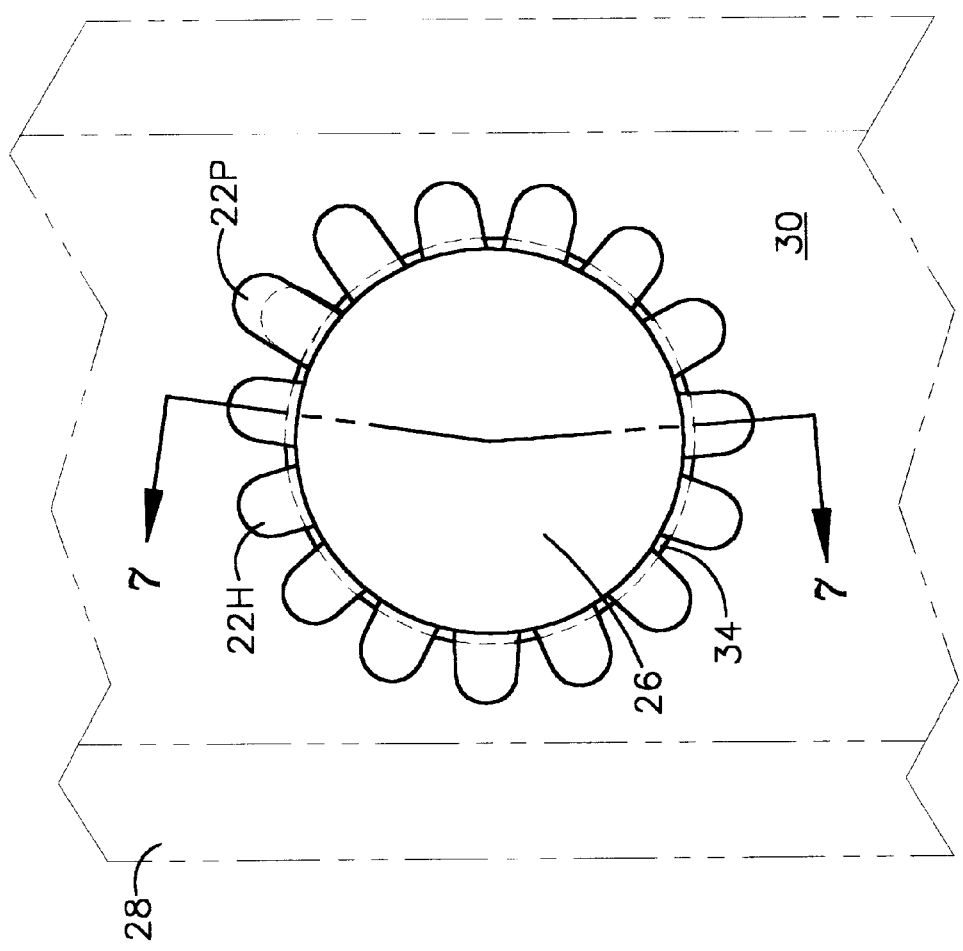
FIG. 6 is a front view of the protective bushing of the present invention installed in a hole in a structural steel member.

Referring now to FIGS. 5 and 6, it can be seen that when extremity 18 is placed into the area of extremity 20, i.e. that portion of base 12 of width $W^1$ is placed inside of that portion of base 12 of width $W^2$ by forming protective bushing 10 into a circle as shown in FIG. 6, the dimensions of $W^1$ and $W^2$ are such that teeth 22 $a$–$h$ and 24 $a$–$h$ nest comfortably and securely inside of teeth 22 $i$–$p$ and 24 $i$–$p$ with area 18' of base 12 abutting area 20' of base 12. Stated differently, when area 18' is placed over area 20' nesting of the various members described above occurs as depicted in FIGS. 4 and 5.

It should be noted at this point that the configuration, spacing, size and shape of many of the elements of protective bushing 10 described herein are largely matters of design choice that can be varied within a range of parameters depending upon the specific application of the particular protective bushing being designed. For example, although teeth 22 $a$–$p$ and 24 $a$–$p$ are shown as arcuately shaped, they could be rectangularly, tiangularly or otherwise shaped. The arcuate shape shown herein, however, presents an optimum compromise among material usage, installation facility and bushing retention factors and represents a preferred embodiment of the protective bushing of the present invention. Similarly, although in the embodiments depicted herein the narrow area 18' and wide area 20' of base 12 each include 8 teeth each in rows 22 and 24, the number of teeth in each of these areas can be altered to adapt to particular installation conditions. For a protective bushing 10 fitting a standard 1" to 2" hole the balance of teeth (8 and 8) shown in the drawings for ¼ inch wide teeth is adequate when base 12 is between about 5.5' and 6.5" long. In the preferred embodiments of the instant invention depicted in FIGS. 4 and 5, teeth 22 *a–p* and 24 *a–p* slant or are splayed outward at an angle of about 25° from the plane of inner surface 13 of base 12.

Application of stud bushing 10 is shown in FIG. 6. As shown in FIG. 6, after a hole 26 has been drilled in a steel structural member or stud 28 stud bushing 10 is turned on itself such that area 18' abuts and lies over area 20' as described above, stud bushing 10 inserted into hole 26 with teeth 22 *a–p* and 24 *a–p* extending about the periphery 34 of hole 26 and stud bushing 10 allowed to expand in accordance with the desires of the material of base 12 to push stud bushing 10 outward against the inner periphery 34 of hole 26 such that surface 13 of base 12 engages the inner periphery of hole 26. In this configuration, teeth 22 *a–p* abut surface 30 of stud 28, while teeth 24 *a–p* abut,surface 32 of stud 28 as shown most clearly in FIG. 7. Once installed as just described, cabling or wiring can be pulled through hole 26 without fear of damage thereto because stud bushing 10 acts to protect the inserted wiring from any sharp or damaging areas on inner periphery 34. The variable height of teeth 22 and 24 *n–p* are meant to simplify the installation procedure by providing added surface with which to grip the periphery during the installation process. As will be obvious to the skilled artisan, a greater number of teeth of greater or lesser height may be used without substantial alteration of the inventive concept described herein.

The material from which stud bushing 10 is fabricated is not of critical importance so long as it provides the resilience required to "spring" base 12 outward and force stud bushing 10 toward the periphery 34 of hole 26 as depicted in FIGS. 6 and 7. Polypropylene, injection molded into the required shape forms a preferred embodiment of the stud bushing described herein.

As the invention had been described, it will be apparent to those skilled in the art that the same may be varied in many ways other than those described herein without departing from the spirit and scope to of the invention. Any and all such modifications are intended to be included within the scope of the appended claims.

What is claimed is:

1. A unitary protective bushing-comprising an elongated base having an inner surface, two opposing ends and at least two areas of distinct width in the areas of said two opposing ends, opposed longitudinal edges and two rows of spaced part teeth extending in splayed relationship from said longitudinal edges such that when the opposing ends are turned upon themselves one of said at least two areas of distinct width nests in the other of said at least two areas of distinct width.

2. The unitary protective bushing of claim 1 wherein said elongated base is of two distinct widths over each half of its length.

3. The unitary protective bushing of claim 2 where in the first of said two distinct widths is equal to or greater than the thickness of the wall of a steel stud and said second of said two distinct widths is equal to or greater than the combination of said first width plus the width of said two rows of spaced apart teeth along said longitudinal edges in the area of said first width.

4. The unitary protective bushing of claim 1 wherein said two rows of teeth each comprise 16 teeth about ¼ inch in width.

5. The unitary protective bushing of claim 1 wherein at least a portion of said teeth in the area of said base abutting one of said opposing ends are of a greater height than the balance of said teeth.

6. The unitary protective bushing of claim 1 wherein said base as an inner surface and said teeth are splayed at an angle of about 25° from said inner surface.

7. A unitary protective bushing comprising an elongated base having an inner surface, two opposing ends and two distinct widths extending over each of two halves of its length, opposed longitudinal edges and two rows of spaced apart teeth extending in splayed relationship from said inner surface such that when the opposing ends are turned upon themselves up to one half of said splayed teeth can nest within the second half of said splayed teeth .

8. The unitary protective bushing of claim 7 having 16 teeth in each of said rows and wherein said teeth splay from said inner surface at an angle of about 25°.

* * * * *